US006442517B1

(12) United States Patent
Miller et al.

(10) Patent No.: US 6,442,517 B1
(45) Date of Patent: Aug. 27, 2002

(54) METHODS AND SYSTEM FOR ENCODING AN AUDIO SEQUENCE WITH SYNCHRONIZED DATA AND OUTPUTTING THE SAME

(75) Inventors: Michael A. Miller, Schaumburg; Ziqiang Qian, Hoffman Estates, both of IL (US)

(73) Assignee: First International Digital, Inc.

( * ) Notice: Subject to any disclaimer, the term of this patent is extended or adjusted under 35 U.S.C. 154(b) by 0 days.

(21) Appl. No.: 09/507,084

(22) Filed: Feb. 18, 2000

(51) Int. Cl.[7] .......................... G10L 19/00; H04J 1/02

(52) U.S. Cl. .................... 704/201; 704/270.1; 704/500; 370/493; 709/236

(58) Field of Search .......................... 704/201, 270.1, 704/500; 370/493; 709/236

(56) References Cited

U.S. PATENT DOCUMENTS

| | | | | |
|---|---|---|---|---|
| 4,476,559 A | * 10/1984 | Brolin et al. | 370/522 |
| 4,992,886 A | 2/1991 | Klappert | |
| 5,281,985 A | 1/1994 | Chan | |
| 5,408,686 A | 4/1995 | Mankovitz | |
| 5,465,240 A | 11/1995 | Mankovitz | 369/1 |
| 5,526,284 A | 6/1996 | Mankovitz | |
| 5,621,538 A | 4/1997 | Gnant et al. | |
| 5,648,628 A | 7/1997 | Ng et al. | 84/610 |
| 5,649,234 A | 7/1997 | Klappert et al. | |
| 5,650,825 A | * 7/1997 | Naimpally et al. | 348/465 |
| 5,677,739 A | * 10/1997 | Kirkland | 348/468 |
| 5,732,216 A | 3/1998 | Logan et al. | |
| 5,777,997 A | 7/1998 | Kahn et al. | |
| 5,778,102 A | * 7/1998 | Sandford et al. | 382/251 |
| 5,778,187 A | 7/1998 | Monteiro et al. | |
| 5,856,973 A | 1/1999 | Thompson | 370/389 |
| 5,886,275 A | 3/1999 | Kato et al. | 84/609 |
| 5,890,910 A | 4/1999 | Tsurumi et al. | 434/307 A |
| 5,900,566 A | 5/1999 | Mino et al. | |
| 5,902,115 A | 5/1999 | Katayama | 434/307 A |
| 5,923,252 A | 7/1999 | Sizer et al. | 340/573.1 |
| 5,923,755 A | 7/1999 | Birch | 380/210 |
| 5,953,290 A | 9/1999 | Fukuda et al. | 369/32 |
| 5,956,439 A | 9/1999 | Pimpinella | |
| 5,980,261 A | 11/1999 | Mino et al. | |
| 5,983,005 A | 11/1999 | Monteiro et al. | |
| 6,022,223 A | 2/2000 | Taniguchi et al. | |
| 6,026,360 A | * 2/2000 | Ono | 704/260 |
| 6,066,792 A | 5/2000 | Sone | |
| 6,094,661 A | 7/2000 | Salomaki | |
| 6,119,163 A | 9/2000 | Monteiro et al. | |
| 6,121,536 A | 9/2000 | Malcolm | |
| 6,169,242 B1 | 1/2001 | Fay et al. | |
| RE37,131 E | 4/2001 | Mankovitz | |

FOREIGN PATENT DOCUMENTS

GB 2323760 9/1998

OTHER PUBLICATIONS

Cravotta, Nicholas, The Internet–Audio (R)evolution; EDN, Feb. 3, 2000, v 45, i3, p101; Cahners Publishing Company.
Intervideo Begins Shipping Full–Featured WinRip MP3 Player; Newswire; Mar. 5, 2001, pp 36.
InterVideo Launches WinRip MP3 Player/Encoder with Data Injection Capability; Newswire Nov. 8, 2000, pp 27.

(List continued on next page.)

*Primary Examiner*—Marsha D. Banks-Harold
*Assistant Examiner*—Donald L. Storm
(74) *Attorney, Agent, or Firm*—Hamman & Benn; Adam K. Sacharoff

(57) ABSTRACT

A method of encoding an audio sequence with synchronized data is provided. An audio sample and a data sample is provided. The audio sample is converted into an audio signal. The data sample is converted into a data signal. The data signal includes a plurality of data segments. Finally, the audio signal is encoded with the data signal to form an audio sequence. The audio sequence includes a plurality of frames. Each frame includes at least one field for receiving at least one data segment of the data signal.

25 Claims, 8 Drawing Sheets

OTHER PUBLICATIONS

Destiny Launches MPE Media Distribution System; Newswire; Jun. 14, 2000.

Destiny Media Technologies Announces 3:1 Common Stock Split; Newswire, Dec. 30, 1999.

Destiny Media Technologies Joins the SDMI; Business Wire, Jun. 13, 200, pp 425.

Rich Media MP3 Player for Nintendo Gameboy Launched at 2000 International CES Show Business Wire, Jan. 7, 2000, pp 83.

MediaX Launches 70,000 Digital Music Downloads on amuznet.com PR Newswire; May 24, 2000.

MusicMatch and InnoGear Partner to Bring Feature–Rich Digital Music Experience to Handspring PR Newswire Jun. 20, 2000.

Magex Expeands Digital Rights Management Around the World Business Wire May 2, 2000, pp 1779.

From Britney to Bacharach; Musicnotes.com Teams with Warner Bros. and Other Music Publishers to Distribute Legal, Copyrighted and Encrypted Digital Sheet Music PR Newswire Jul. 26, 2000, pp 8574.

ClickRadio Granted First Interactive Radio License by Universal Music Group PR Newswire, Apr. 20, 2000.

Clickradio Receives Interative Radio License from Alligator Records, Largest Independent Blues Label; PR Newswire, Aug. 28, 2000.

iMagicTV and Motorola to Demonstrate Broadband Television Solution at 2001 International CES PR Newswire Jan. 4, 2001, pp 9139.

Saraiya, Alpesh; Chien, William; Encoding Solutions for MPEG Systems; WESCON/95 Conference Record (cat No. 95CH35791) 1995, p. 732; IEEE, NY, NY USA.

* cited by examiner

METHODS AND SYSTEM FOR ENCODING AN AUDIO SEQUENCE WITH SYNCHRONIZED DATA AND OUTPUTTING THE SAME

FIELD OF THE INVENTION

The present invention relates to audio sequences, and, more particularly, to the encoding of an audio sequence with synchronized data, and the output of such an encoded file.

BACKGROUND OF THE INVENTION

Karaoke is a musical performance method in which a person (i.e., the singer) performs a musical number by singing along with a pre-recorded song through the reading of that particular song's lyrics, which are preferably displayed on a display device, such as, for example, a television screen situated within view of the singer. The singer's voice overrides the voice of the original singer of the pre-recorded song. A video motion picture, often referred to as a music video, may also typically be displayed as an accompaniment to both the music and the singer. Devices providing this opportunity are known as karaoke musical reproduction devices, and will be referred to as karaoke devices.

Current karaoke devices use tapes, compact disks (CDs), digital videodisks (DVDs), computer disks, video compact disks (VCDs) or any other type of electronic medium to record and play both the music and the lyrics. With the rise in popularity of karaoke as an entertainment means, more and more songs are put in karaoke format. As a result, the need to transport and store these ever-growing musical libraries has become paramount. In some instances, digitized data representing the music and the lyrics has been compressed using standard digital compression techniques. For example, one popular current digital compression technique employs the standard compression algorithm known as Musical Instrument Digital Interface (MIDI). U.S. Pat. No. 5,648,628 discloses a device that combines music and lyrics for the purpose of karaoke. The device in the '628 Patent uses the standard MIDI format with a changeable cartridge which stores the MIDI files.

The International Organization for Standardization (ISO/IEC) has produced a number of generally known compression standards for the coding of motion pictures and audio data. This standard is generally referred to as the MPEG (Motion Picture Experts Group) standard. The MPEG standard is further defined in a number of documents: ISO/IEC 11172 (which defines the MPEG 1 standard) and ISO/IEC 13818 (which defines the MPEG 2 standard), both of which are incorporated herein by reference. Another, non-standard compression algorithm, which is based on MPEG 1 and MPEG 2 standards, is referred to as MPEG 2.5. These three MPEG versions (MPEG 1, MPEG 2, MPEG 2.5) are often referred to as "MPEG ½." U.S. Pat. No. 5,856,973 discloses a method for communicating private application data along with audio and video data from a source point to a destination point using the MPEG 2 format, designed for the broadcasting of television quality sample rates.

The MPEG audio formats are further broken into a number of "layers." In general, the higher an MPEG audio format and the higher the layer is labeled, the more complexity is involved. The third layer, Layer III for the above mentioned MPEG audio formats is commonly known as the MP3, which has established itself as an emerging popular compression format for encoding audio data in an effort to produce near-CD quality results.

MP3 players are portable devices, typically containing a "flash" memory, a liquid crystal display (LCD) screen, a control panel and an output jack for audio headphones and other similar devices. Musical compositons are loaded into the "flash" memory of the MP3 player through connection to a personal computer (PC) or other similar device, and played for personal enjoyment.

The MP3 standard defines an "audio sequence," which is broken down into variable size "frames," which are further broken down into "fields." Although the syntax of each frame is described in the MP3 standard, the content of the fields within each frame is not defined and is the subject of the present invention.

Typical karaoke devices are large, complex expensive systems used in bars and nightclubs. They involve large display screens, high fidelity sound systems and a multitude of storage media, such as, for example, CDs. Typical MP3 players are small and affordable, but are designed to simply play music. They have small display screens to display only the title and play time of a song, limited audio output to a headphone, and minimal (if any) microphone.

Typical MP3 players do not currently possess the ability to synchronize a data field, containing lyrical information of a song, with an audio signal, containing the musical aspect of the song, into a single audio sequence file that can be stored, manipulated, transported and/or played via a karaoke player device.

Accordingly, it would be desirable to have a program and method that overcomes the above disadvantages.

BRIEF DESCRIPTION OF THE DRAWINGS

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE PRESENTLY PREFERRED EMBODIMENTS

In the present invention, a preferred embodiment for encoding an audio sequence with synchronized data takes place according to the MP3 standard, as described above. The present invention is applicable to any frame-based audio format, such as but not limited to MPEG 1, Layer III, as described in ISO/IEC 11172-3:1993 TC 1:1996, Information Technology—Coding of Moving Pictures and Associated Audio for Digital Storage Media at up to about 1.5 Mbits/s, Part 3, Audio, MPEG 2, Layer III, as described in ISO/IEC 13818-3:1998, Information Technology—Generic Coding of Moving Pictures and Associated Audio, Part 3, Audio; MPEG 2.5, Layer III; and Advanced Audio Coding ("AAC") as described in ISO/IEC 13818-7:1997, TC1:1998, Information Technology—Generic Coding of Moving Pictures and Associated Audio, Part 7, Advanced Audio Coding. As such when used herein the term MP3 may refer to an audio sequence formatted in any of the above mentioned frame-based audio formats.

Figure 1:
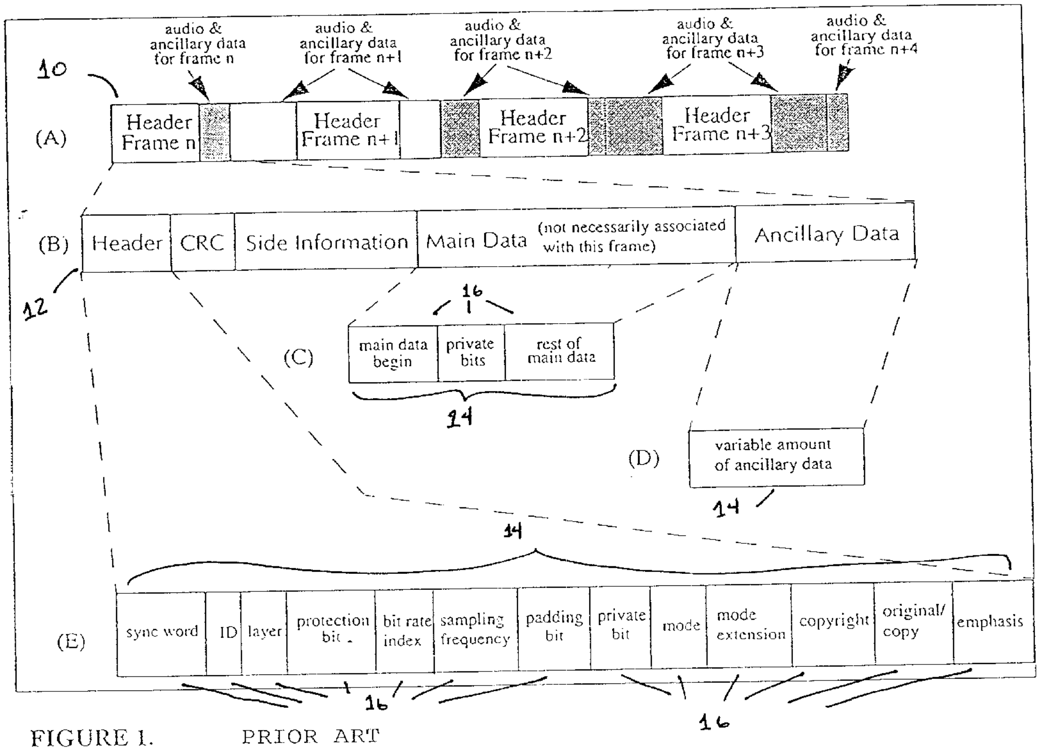
FIGURE 1. PRIOR ART
FIG. 1 is a block diagram illustrating the syntax of the MP3 audio sequence, as described in the MP3 specification standard.

As mentioned above, the MP3 standard defines an "audio sequence." A typical audio sequence of the MP3 standard is illustrated in FIG. 1. The audio sequence 10 (shown in more detail in of FIG. 1-A) is broken into variable size "frames" 12. An example of one frame of the audio sequence is shown in FIG. 1-B.

Each frame is then further broken down into a plurality of fields 14 and sub-fields 16. Examples of some of the fields 14 and sub-fields 16 of the frame 12 shown in FIG. 1-B are illustrated FIGS. 1-C, 1-D and 1-E. In the preferred embodiment, each frame 12 of the audio sequence 10 includes a fixed format made up of a header field, an error check field, a main data field and an ancillary data field. Furthermore, each of the fields 14 are broken down further into sub-fields 16, an example of which is shown within the divisions of FIGS. 1-C, D and E. Although the syntax of each frame 12 is described in the MP3 standard, the content of both the fields 14 and the sub-fields 16 within each frame 12 are not defined within the MP3 standard. In addition, the private bits defined in both the header and the audio data frames, as well as the ancillary data frame, can be used to encode lyrical data and control signals, or cues to lyrical data and control signals, within the audio sequence 10, such that it is synchronized with the audio signal upon the formation of the audio sequence 10.

It is important to note that the header fields for each frame 12 occur within a fixed period and are a specific size. The data fields associated with each frame 12, however, are of variable size and do not occur within a fixed period.

More particularly, the present invention concerns using the private bit in the header field (FIG. 1-E, Field 8), the private bits in the main data field (FIG. 1-C, Field 2) and the ancillary data field (FIG. 1-D) to be embedded with lyrical text, video, cues to lyrical text or video, and/or control information. This information will be collectively referred to as karaoke data. It should be noted that each frame may or may not include any karaoke data.

If a frame does include karaoke data, such data may be stored within any or all portions of the available data fields mentioned above. Preferably the above-described information will be stored within the data fields in the following order: first, the private bit in the header field; second, the private bits in the main data field; and third, the ancillary data field.

Figure 2:
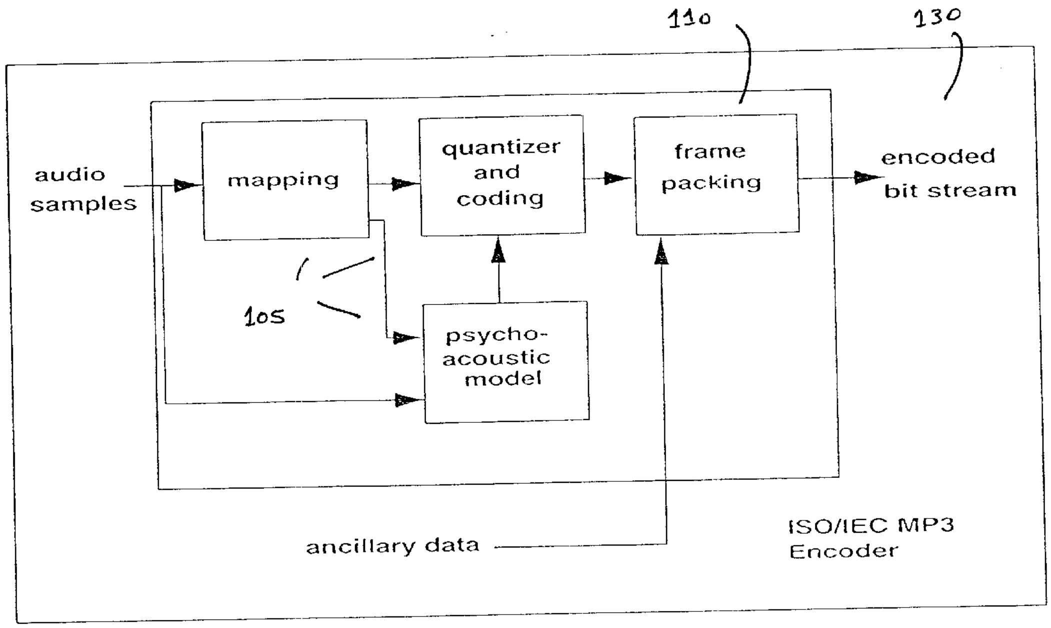
FIGURE 2. PRIOR ART
FIG. 2 is a schematic diagram of an MP3 encoder, as described in the MP3 specification standard.
Figure 3:
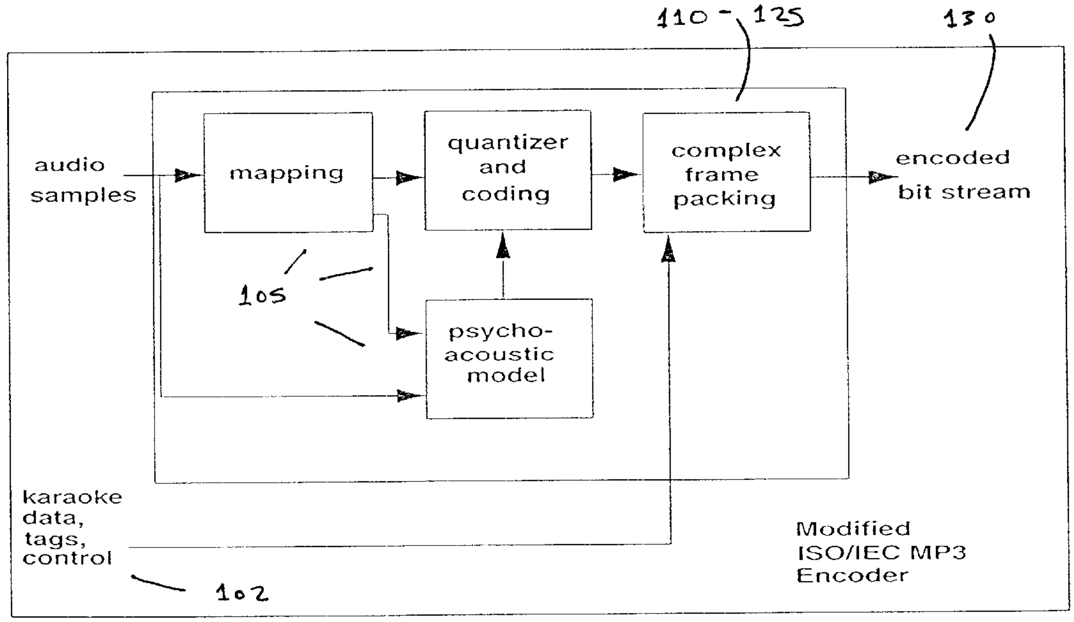
FIG. 3 is a schematic diagram, illustrating a modified MP3 encoder, in accordance with the present invention, to embed karaoke data with an audio signal to form an MP3 audio sequence.
Figure 4:
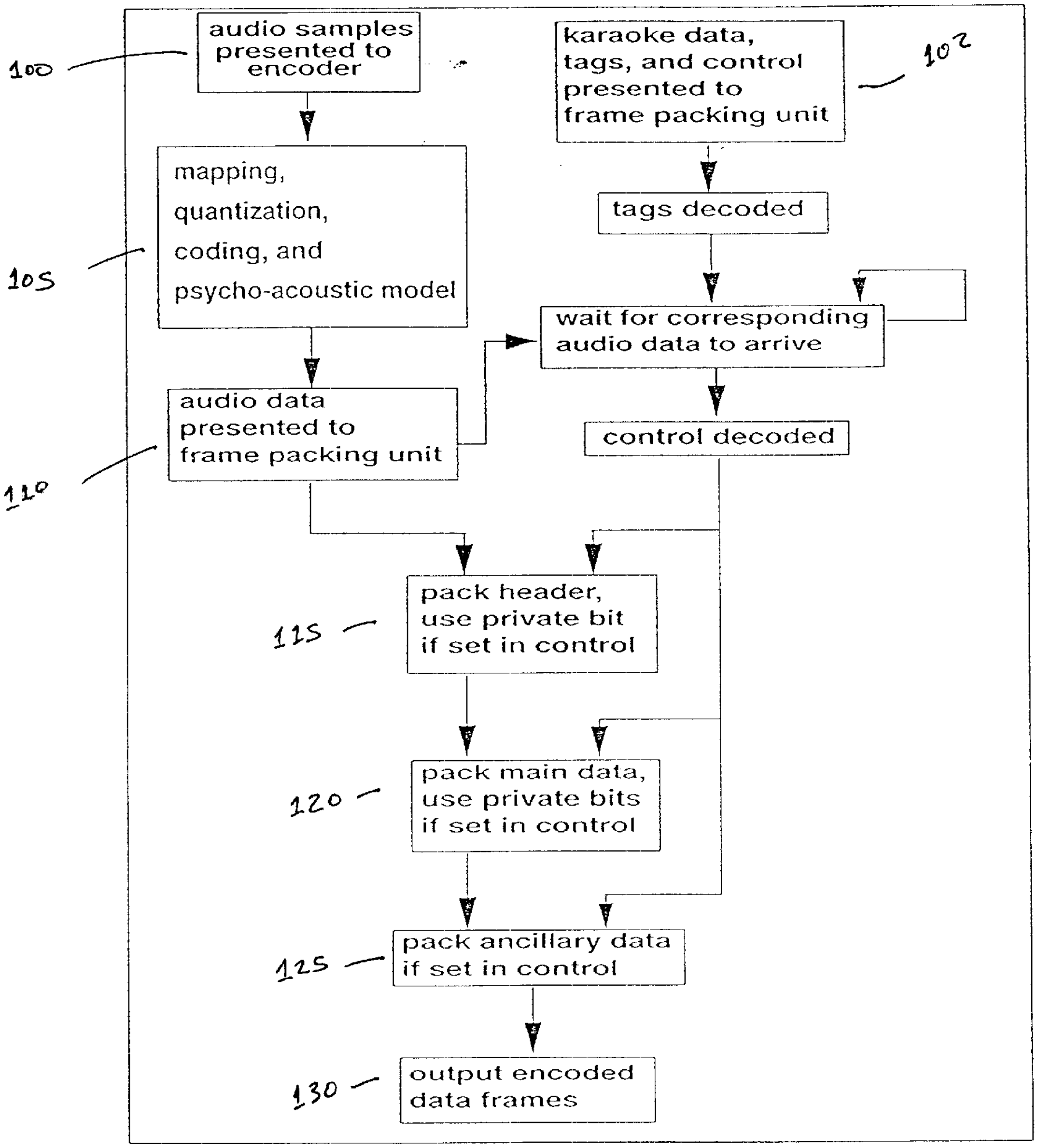
FIG. 4 illustrates a flow chart of the encoding process, in accordance with the present invention.
Figure 5:
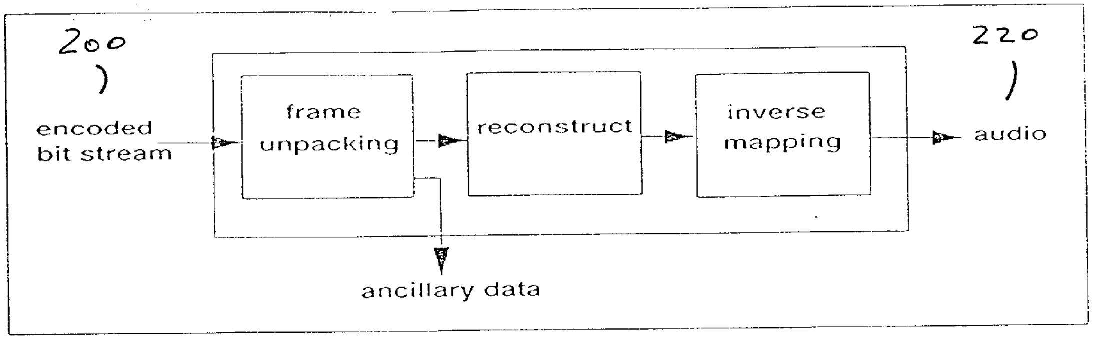
FIGURE 5. PRIOR ART
FIG. 5 is a schematic diagram of an MP3 decoder, as described in the MP3 specification standard.
Figure 6:
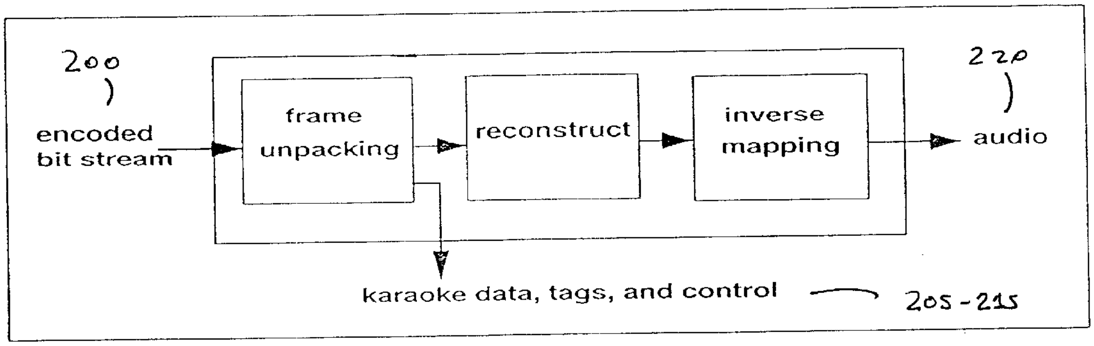
FIG. 6 is a schematic diagram, illustrating a modified MP3 decoder, made in accordance with the present invention, to un-embed karaoke data and an audio signal from an MP3 audio sequence.
Figure 7:
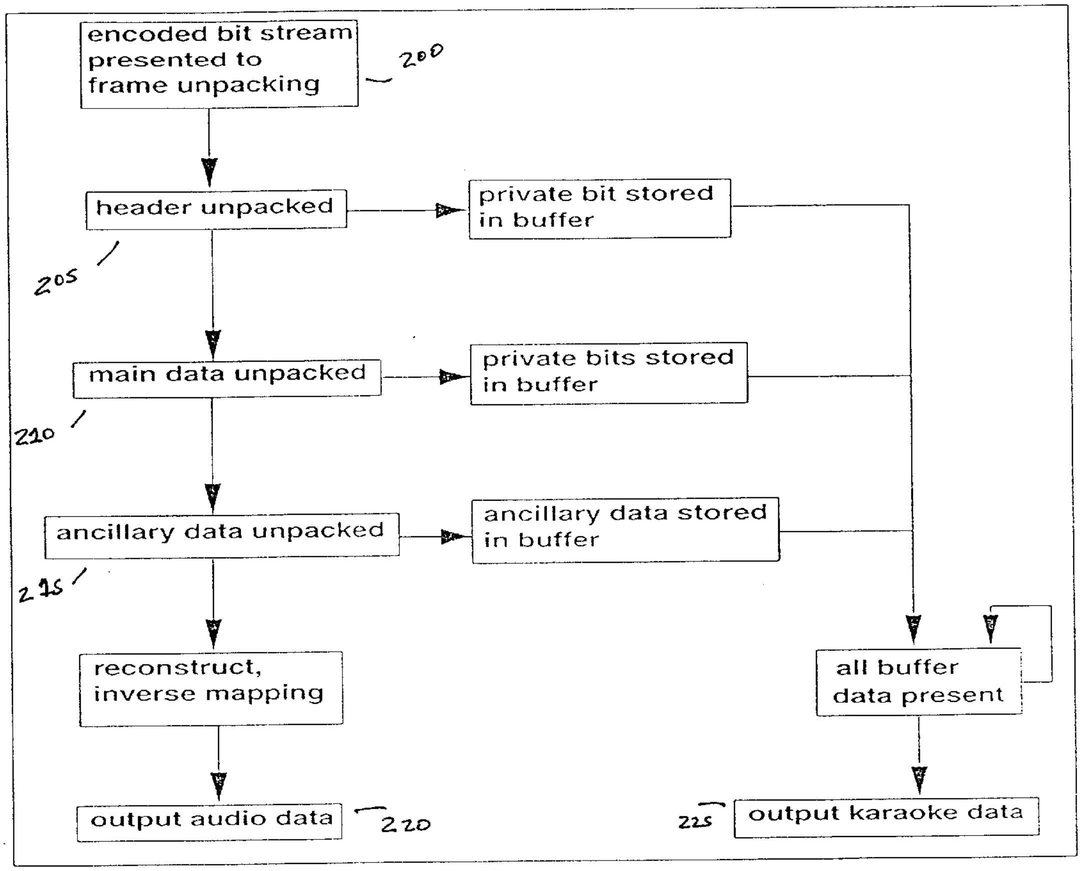
FIG. 7 illustrates a flow chart of the decoding process, in accordance with the present invention.

FIG. 2 shows a high level block diagram of an MP3 encoder as described in the MP3 specification. As mentioned above, karaoke data may be encoded in the private bit of the header field, the private bits in the main data field, or within the ancillary data. FIG. 3 illustrates a high level block diagram of a modified MP3 encoder used to encode the karaoke data. The frame packing stage of the encoder must be enhanced to synchronize incoming audio data with karaoke data to pack the frames accordingly. This is done by sending in tags and control information with the karaoke data. The "complex frame packing" unit uses this information to sequence the karaoke data with the audio samples appropriately. FIG. 4 illustrates a flow chart detailing the encoding process of the present invention, with a focus on frame packing the karaoke data. Additionally, FIG. 5 illustrates a high level block diagram of an MP3 decoder, as described in the MP3 specification. FIG. 6 illustrates a high level block diagram of a modified version of the MP3 decoder. FIG. 7 describes a flow chart of the decoding process with a focus on karaoke data unpacking. During the decoding process, the karaoke data is produced during the frame unpacking stage while the audio data is produced as a final product of the inverse mapping stage. The karaoke data is then sequenced with the audio data external to the decoder.

With reference to FIGS. 1–4, a method of encoding an audio sequence is provided for, as follows. According to the present invention, an encoder receives both an audio sample and a data sample (step 100). Preferably, the encoder is a system that is developed to synchronously encode an audio sample with a data signal, creating an audio sequence. In the preferred embodiment, the audio sample is a musical composition. Alternatively, the audio sample may be an oral signal, such as, for example, an audio version of a text, such as, for example, a book, a newspaper or a foreign language textbook. In the preferred embodiment, the data sample may be the words to a musical composition. Alternatively, the data sample may be an oral version of a text, such as, for example, an audio version of an English language text or video data, corresponding to, for example, a music video of the song embodied in the audio sample.

After receiving the audio sample and the data sample, the encoder then converts the audio sample into an audio signal (not shown). Preferably, the conversion process assures that the audio signal will be able to be read and understood according to the preferred format of the audio sequence. For example, if the format of the audio sequence is MP3, then the audio signal will preferably be able to be read according to the MP3 format.

In much the same way, the data sample is converted into a data signal (step 102). Further, the data signal may include a plurality of data segments. Each of the data segments preferably corresponds to a portion of the data sample, such that it may be embedded into the resultant audio sequence. Not all portions of the data signal need be encoded within the data segments. Rather, each of the data segments may contain a fractional portion of the data signal corresponding to the data signal.

For example, if the data sample contains the words to a song, the data signal would include various data segments, each segment corresponding to, for example, a word or a beat. The purpose for this, which will be described in more detail below, allows the data segment to be embedded into the audio sequence, both in an order and in a location such that the data signal corresponds to the audio signal (i.e., in such a manner that the data signal is synchronized to the audio signal).

The data signal may also include a control signal. Preferably, the control signal contains information relating to the order of embedding of the data signal within the audio sequence. For example, the control signal may dictate that, during the encoding process, one particular word of the lyrics contained within the data signal may contain three syllables, each syllable requiring position at a different beat of the song. Such information would be preferably contained within the control signal.

After converting both the audio signal and the data signal, the audio sequence is then encoded. The audio sequence consists of the audio signal, as converted above, embedded with the data signal, also as converted above, in such a way that the data signal is synchronized with the audio signal. This synchronization preferably occurs by embedding, into one of the frames of the audio sequence, one of the data segments.

More particularly, the encoding process occurs preferably in the following manner. First, the audio signal is mapped into a plurality of audio segments (step 105). These audio segments, which are similar in nature to the above-described data segments, preferably correspond to one beat of the song. After the control signal is encoded and included within the data signal, each audio segment is packed into one of the frames of the audio sequence (step 110). Additionally, one of the data segments is packed into the frames of the audio sequence, such that the data segment corresponds to the audio segment packed into the frame of the audio sequence.

Preferably, the sequence of encoding is such that the data segments are embedded into the audio sequence in the private bit in the header field first (step 115). Upon filling that private bit, any future data segments are preferably embedded into the private bit in the main data field (step 120). If both of the private bits are filled, then any remaining data segments would be embedded into the ancillary data field (step 125).

It should be noted that the data signal is embedded into a lower level of the audio sequence (i.e., the fields and sub-fields), as opposed to a high level, such as within the frames themselves. In this way, all the embedded data will be supported by standard MPEG decoders, and no additional circuitry will be needed to capture the data.

In operation, for example, assuming the musical composition to be the musical composition "Layla," the audio sample would contain the music to the composition. The data sample would be the lyrics to the composition. Both samples are then converted to, for example, MP3 formats. During the encoding process, the lyrics to the song would be separated in accordance with the beat or tempo of the music. Thus, the first line of the song ("What would you do if you get lonely?") would be separated into the first nine beats of the music, one for each syllable. The data signal and the audio signal would then be encoded to form the audio sequence in a manner such that the frame containing the first beat would also contain the first word, and so on.

Alternatively, in an alternative embodiment, and in lieu of encoding the audio sequence with the data, the audio sequence may be encoded with a series of pointer signals. The pointer signals refer to the data signal, which, in this embodiment, is stored in a separate file. Additionally, the pointer signals reference the data signal in accordance with the instructions contained within the control signal, and are synchronized in the same way as the data signal is synchronized in the preferred embodiment (i.e., the pointer signals would refer to the data signals in such a way that the audio sequence is synchronized with the data signal).In this case, the audio sequence would be encoded in such a manner that the frame containing the first beat would also contain a pointer referencing the separate data file.

After the encoding process has taken place, the audio sequence may be outputted to either a karaoke player, or to any presently known storing medium for play at a future time (step 130). With reference to FIGS. 1–7, a method of outputting an audio signal having a synchronized data signal is provided. The audio sequence, encoded preferably in the manner set forth above, is provided (step 200). Contained within the audio sequence is a compressed audio signal. This compressed audio signal corresponds to the audio signal, described above, which contains the song portion of the musical composition. Additionally provided is a compressed data signal, corresponding to the lyrical portion of the musical composition. The compressed data signal may be located within the audio signal, or within a separate data file (in which case, the audio sequence may include the pointer signals), as described above. At this point, the compressed data signal is currently synchronized with the compressed audio signal. The compressed data signal is then unpacked and stored in a buffer (steps 205, 210, 215). The compressed audio signal is also unpacked. Both signals are then synchronously outputted to an output device, which may be, for example, a karaoke player system (steps 220, 225). Alternatively, the output device may be a speaker, a stereo system, a video system or any other similar device.

Figure 8:
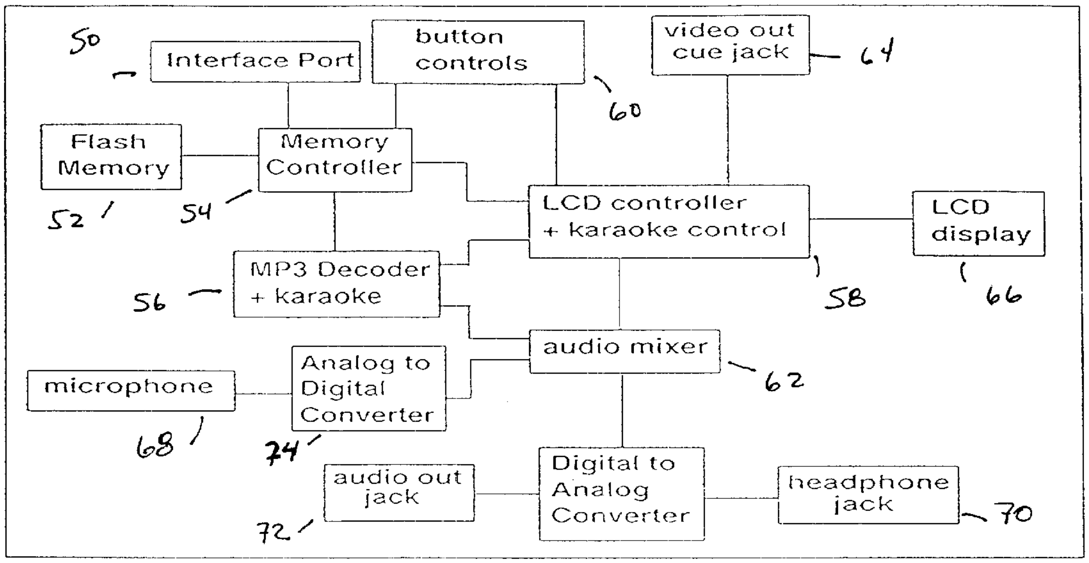
FIG. 8 illustrates a block diagram showing the MP3 karaoke player apparatus.

Turning now to a discussion of the apparatus, FIG. 8 shows a block diagram of an MP3 karaoke player device. Referring to FIG. 8, in conjunction with FIGS. 1–7, the Interface Port 50 preferably interfaces to an external storage source, preferably through a docking station or cable. The Interface Port 50 is used to transfer ".mp3" files from the external source to the karaoke player device to be stored in the karaoke player device's Flash Memory 52. The external storage source may be a Personal Computer or other similar external device.

The Flash Memory 52 is used to store one or more ".mp3" files to be played by the MP3 karaoke player. This type of memory can be overwritten with new information, but will "remember" any files that are stored in it until it is overwritten on purpose.

The Memory Controller 54 is used to coordinate the interface between the Interface Port 50 and the Flash Memory 52, between the Flash Memory 52 and the MP3 Decoder 56, and between the Flash Memory 52 and the LCD controller 58. Additionally, the Memory Controller 54 is preferably used to interface to the person using the karaoke player device through the Button Controls 60.

The MP3 Decoder 56 provides the function as described above. That is, decodes the MP3 karaoke file, (i.e., the ".mp3 file"), and outputs audio data to the Audio Mixer 62 and karaoke data to the LCD/karaoke Control 58.

The LCD/karaoke Control 58 has several functions. First, it controls the LCD display to display text and lyrics, highlight words, and scroll lines of text. The LCD/Karaoke Control 58 also sends video cues received from the MP3 Decoder 56 to the Video Out Cue Jack 64 for external processing. Finally, it controls the Audio Mixer 62 to allow the person using the device's voice to over-ride the singers'voice in the original song.

The Button Controls 60 allow the person using the device to control operation of the karaoke player device. Preferably, the button controls 60 include buttons for Play, Forward, Reverse, Pause, Stop, as well as other basic functions. The button controls 60 allow the user to select a specific song to play and/or sing along with, skip songs, pause or otherwise manipulate the songs according to the user's desires.

The Video Out Cue Jack 64 is provided to interface with an external device controlling the display of a music video. It is also used to send signals being decoded by the MP3 decoder 56 to this external device to sequence the music video along with the file being played by the MP3 karaoke player.

The LCD Display 66 provides the visual interface to the person using the karaoke player device. The LCD display 66 is large enough and flexible enough to display several rows of text, highlight text, scroll lines of text, etc. The LCD display 66 also provides karaoke functionality. The display 66 is preferably flexible enough to display characters in many languages, as the song playing may be in a different language than the display shows.

The Audio Mixer 62 is used to mix the source audio provided by the MP3 Decoder 56 with the voice of the person using the device from the microphone 68. The user's voice over-rides the singer's voice in the original audio. The output of the Audio Mixer 62 is preferably sent to both a Headphone Jack 70 and an Audio Out Jack 72, preferably through a Digital to Analog Converter 74.

Finally, the Microphone 68 allows the person using the device to sing along with the musical composition as it is played, guided by the lyrics displayed on the LCD Display 66.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

We claim:

1. A method of encoding an audio sequence defined as a plurality of frames with synchronized data, comprising the steps of:

providing an audio sample and a data sample;

converting the audio sample into an audio signal, the audio signal including a plurality of audio segments, such that each audio segment may be packed in one of the frames of the audio sequence;

converting the data sample into a data signal, the data signal including a plurality of data segments;

packing the audio segments into the plurality of frames;

when the audio segments are being packed into the plurality of frames a data segment corresponds to the audio segment, embedding said data segment into the frame containing said corresponding audio segment, to form an audio sequence that contains a plurality of frames with audio segments and embedded data segments that are synchronized to said audio segments; and encoding the audio segments and corresponding embedded data segments to form an encoded audio sequence.

2. The method of claim 1, wherein the data signal further includes a control signal; and further comprising the step of:

encoding the audio sequence in accordance with instructions contained within the control signal.

3. The method of claim 2, further comprising the step of outputting the audio sequence.

4. The method of claim 1, wherein the audio sequence is provided in a format selected from the group of formats consisting of MPEG 1 Layer III, MPEG 2 Layer III and MPEG 2 AAC.

5. The method of claim 1, wherein the data sample further includes text data.

6. The method of claim 1, wherein the data sample further includes video data.

7. The method of claim 1, wherein the audio sample comprises a song.

8. The method of claim 1, wherein the audio sample comprises spoken voice.

9. A program for encoding an audio sequence defined as a plurality of frames with synchronized data from a data signal, comprising:

computer readable program code that provides an audio sample and a data sample;

computer readable program code that converts the audio sample into an audio signal, the audio signal including a plurality of audio segments, such that each audio segment may be packed in one of the frames of the audio sequence;

computer readable program code that converts the data sample into a data signal, the data signal including a plurality of data segments;

computer readable program code that packs the audio segments into the plurality of frames;

when the audio segments are being packed into the plurality of frames a data segment corresponds to the audio segments, having computer readable program code that embeds said data segment into the frame containing said corresponding audio segment, to form an audio sequence that contains a plurality of frames with audio segments and embedded data segments that are synchronized to said audio segments; and computer readable program code that encodes the audio segments and corresponding embedded data segments to form an encoded audio sequence.

10. A method of encoding an audio sequence defined as a plurality of frames with synchronized data, comprising the steps of:

providing an audio sample and a data sample;

converting the audio sample into an audio signal, the audio signal including a plurality of audio segments, such that each audio segment may be packed in one of the frames of the audio sequence;

converting the data sample into a data signal, the data signal including a plurality of data segments;

providing a plurality of pointer signals, each pointer signal referencing at least one data segment of the data signal;

packing the audio segments into the plurality of frames;

when the audio segments are being packed into the plurality of frames a data segment corresponds to the audio segment, embedding the pointer signal that references said data segment into the frame containing said corresponding audio segment, to form an audio sequence that contains a plurality of frames with audio segments and embedded pointer signals that reference data segments such that the data segments are synchronized to said audio segments; and encoding the audio segments and corresponding embedded pointer signals to form an encoded audio sequence.

11. The method of claim 10, wherein the data signal further includes a control signal; and further comprising the step of:

encoding the audio sequence in accordance with instructions contained within the control signal.

12. The method of claim 11, further comprising the step of outputting the audio sequence.

13. The method of claim 10, wherein the audio sequence is provided in a format selected from the group of formats consisting of MPEG 1, and MPEG 2.

14. The method of claim 10, wherein the data sample further includes text data.

15. The method of claim 10, wherein the data sample further includes video data.

16. The method of claim 10, wherein the audio sample comprises a song.

17. The method of claim 10, wherein the audio sample comprises spoken voice.

18. A program for encoding an audio sequence defined as a plurality of frames with synchronized data, comprising:

computer readable program code that provides an audio sample and a data sample;

computer readable program code that converts the audio sample into an audio signal, the audio signal including a plurality of audio segments, such that each audio segment may be packed in one of the frames of the audio sequence;

computer readable program code that converts the data sample into a data signal, the data signal including a plurality of data segments and allocates a plurality of pointer signals, each pointer signal referencing at least one data segment of the data signal;

computer readable program code that packs the audio segments into the plurality of frames;

when the audio segments are being packed into the plurality of frames a data segment corresponds to the audio segments, having computer readable program code that embeds the pointer signal that references said data segment into the frame containing said corresponding audio segment, to form an audio sequence that contains a plurality of frames with audio segments and embedded pointer signals that reference data segments such that the data segments are synchronized to said audio segments; and computer readable program code that encodes the audio segments and corresponding pointer signals to form an encoded audio sequence.

19. A method of outputting an audio signal and a data signal that is synchronized with said audio signal in an audio sequence, comprising the steps of:

providing an audio sequence having a plurality of frames, defined as storing a compressed audio signal with a compressed data signal that is synchronized and embedded within the plurality of frames;

decoding the compressed data signal and the compressed audio signal;

unpacking the plurality of frames in order to unpack the compressed data signal and the compressed audio signal from the audio sequence; and outputting the audio signal and the data signal to an output device.

20. The method of claim 19, wherein the audio sequence further includes a plurality of pointer signals, each pointer signal referencing the compressed data signal, and the step of unpacking the plurality of frames further includes the step of unpacking the pointer signals.

21. The method of claim 19, wherein the audio sequence is in either an MPEG 1 or MPEG 2.

22. The method of claim 19, wherein the audio signal is a signal selected from the group consisting of a song and a spoken voice, and wherein the data signal is a signal selected from the group consisting of text and a spoken voice.

23. The method of claim 19, wherein the output device is a device selected from the group consisting of a speaker, a stereo system, a karaoke system and a video system.

24. A program for outputting an audio signal and a data signal that is synchronized with said audio signal in an audio sequence, comprising:

computer readable program code that upon reception of an audio sequence, defined by a plurality of frames and that contains a compressed audio signal and a compressed data signal that is synchronized and embedded within said frames the computer readable program code further including;

instructions that decodes the compressed data signal and the compressed audio signal;

instructions that unpacks the plurality of frames in order to unpack the compressed data signal and the compressed audio signal from the audio sequence; and instructions that outputs the audio signal and the data signal to an output device.

25. The method of claim 24, wherein the audio sequence further includes a plurality of pointer signals, each pointer signal referencing the compressed data signal.

* * * * *